United States Patent [19]

Tyner et al.

[11] Patent Number: 5,649,310
[45] Date of Patent: Jul. 15, 1997

[54] SIGNAL TRANSLATION AND AMPLIFICATION SYSTEM INCLUDING A THERMAL RADIATION PANEL COUPLED THERETO

[75] Inventors: Randall D. Tyner, Mountainview; Donald C. Briggs, Cupertino; Daniel E. Collins, Redwood City; William R. Avellino, Los Altos Hills, all of Calif.

[73] Assignee: Space Systems/Loral, Inc., Palo Alto, Calif.

[21] Appl. No.: 259,987

[22] Filed: Jun. 15, 1994

[51] Int. Cl.$^6$ .......................... H04B 7/185; H01J 23/033; H01J 25/34
[52] U.S. Cl. .............. 455/129; 330/43; 315/3.6; 315/5.38; 313/45; 313/46; 361/702; 361/711; 361/722
[58] Field of Search ...................... 315/3.6, 5.38; 313/45, 46, 35, 36; 361/688, 689, 702, 707, 711, 712, 722; 455/129; 330/43

[56] References Cited

U.S. PATENT DOCUMENTS

| | | | |
|---|---|---|---|
| 3,426,230 | 2/1969 | Webb | 315/46 X |
| 3,448,313 | 6/1969 | Boilard et al. | 315/5.33 X |
| 3,448,325 | 6/1969 | Lien et al. | 315/5.38 X |
| 4,107,574 | 8/1978 | Ruf et al. | 315/5.38 X |
| 4,109,202 | 8/1978 | Kudsia et al. | 455/13.3 |
| 4,232,249 | 11/1980 | Alsberg | 315/3.6 |
| 4,471,266 | 9/1984 | Fleury et al. | 315/3.5 |
| 4,701,716 | 10/1987 | Poole | 330/43 |
| 4,742,294 | 5/1988 | Gallios | 315/3.5 X |
| 4,745,369 | 5/1988 | Wanninger | 330/43 |
| 5,204,686 | 4/1993 | Petrelis et al. | 342/374 |
| 5,260,623 | 11/1993 | Bradatsch | 313/45 X |
| 5,332,030 | 7/1994 | Spencer et al. | 165/32 |
| 5,334,907 | 8/1994 | Desmur et al. | 313/46 X |

FOREIGN PATENT DOCUMENTS

| | | | |
|---|---|---|---|
| 4238136 | 2/1994 | Germany. | |
| 4-171629 | 6/1992 | Japan | 315/5.38 |
| 4-366528 | 12/1992 | Japan | 315/5.38 |

OTHER PUBLICATIONS

"Flight Hardware Test Results Obtained on High Power Equipment and on the Repeater Subsystem of 12GHz DBS", W. Liebisch et al., 86–0646 AIAA, pp. 266–274, 1986.

"A 12GHz, 150W Traveling Wave Tube for Broadcast Satellites" Y. Morishita et al., 86–0690 AIAA, pp. 525–531, 1986.

Scherba, M. K., "Space Tube with High Efficiency Cooling Design Approach"; *IEEE* 1980; pp. 164–167.

"The Thermal Control System Of The Germa Direct Transmitting Communication Satellite TV–SAT", Kreeb et al., AIAA 8th Communications Satellite Systems Conference, Apr. 20–24, 1980.

"Excess Liquid Formation In Orbit Test Results of Axially Grooved Heat Pipes", Meyer et al., Journal of Spacecraft and Rockets, vol. 23, No. 5, Sep. 1986.

"Warmerohrtechnologie In Der Raumfahrt" Laux et al., Zeitschrift Fur Flugwissenschaften Und Weltraumforschung, vol. 9, No. 4, Jul. 1985.

*Primary Examiner*—Benny T. Lee
*Attorney, Agent, or Firm*—Perman & Green

[57] ABSTRACT

A satellite is formed with a signal translation and amplification system which includes at least one communication path. Each communication path includes a plurality of radiation-cooled TWTs powered by a single EPC. Also included in the communication path is a high efficiency radiation panel capable of transmitting heat generated by said TWTs and EPC into space; as well as a radiating collector which is directly applied to each TWT, and is capable of transmitting heat generated by said TWT into space.

14 Claims, 5 Drawing Sheets

SIGNAL TRANSLATION AND AMPLIFICATION SYSTEM INCLUDING A THERMAL RADIATION PANEL COUPLED THERETO

FIELD OF THE INVENTION

This invention relates generally to high power satellites, and in particular, to a unique combination of high power amplifiers and heat dissipation techniques that are utilized by an earth satellite. This permits a significant increase in output power for a given satellite size thus reducing satellite launch mass and, therefore, cost.

BACKGROUND OF THE INVENTION

A major benefit which results from providing stronger signals from satellite transmissions to earth based receivers is that smaller, less expensive, and simpler earth based satellite receive antennas ("dishes") can be employed. The use of smaller satellite dishes makes the use of satellite transmission more competitive with terrestrial transmission modes such as fiber, cable, etc., which will likely result in greater acceptance of satellite communications in general.

One technique for providing stronger satellite signals involves increasing the signal strength of the traveling wave tube (hereinafter referred to as "TWT") applied to each channel, or an increase in the number of TWTs of similar strength being applied to each channel, in an effort to produce a stronger signal being transmitted over each channel by the satellite. An increase in the signal strength being produced by each TWT typically requires a careful consideration of the cooling configuration, since a substantial portion of the energy associated with the production of the signal within each TWT is converted into heat energy which must be removed.

In recent decades, design considerations for satellites, and more particularly communication satellites, have included providing satellites with more power for each channel, and more channel transmission capabilities for each satellite. These considerations have frequently been balanced against other considerations which include the weight of the satellite. The greater the weight of the satellite (greater satellite operational lifetimes typically require satellites with a greater mass) generally the greater is the cost of the launch vehicle required for the satellite.

One component which is frequently used in communication satellites is the TWT which functions as the power amplifier. A traveling wave tube amplifier (hereinafter referred to as "TWTA") generally consists of a TWT plus its high voltage power supply (or electronic power conditioner, "EPC"). One design limitation of the TWT is that it generates a considerable amount of heat. Most high power communication satellites presently use conduction-cooled TWTs. The use of conduction cooled TWTs necessitates the use of heat spreaders and heat pipes to distribute the heat produced by the TWT, and large specialized radiating surfaces to transfer this waste heat into space. The thermal requirements, as well as the associated satellite weight and size limitations for launch on a given vehicle, further limit the number of high power TWTs which can be carried on a satellite of a given size.

Some TWTs are known to utilize one EPC for each pair of TWTs, this combination not only reduces overall power and amplifier weight but may provide other unrelated performance benefits. However, heat dissipation associated with TWTs remains a major limitation on the number of TWTs which each satellite is capable of carrying. This is generally true because the total heat dissipation capacity of a satellite is generally proportional to the size of the satellite.

A method to increase the heat dissipation capacity of a satellite is to employ TWTs which radiate a portion of the waste heat directly to space. Early radiation-cooled TWT configurations were not efficient, and the number of operating TWTs that a given satellite could accommodate was limited to some small number, such as five.

From the above, it can be envisioned that a TWT configuration which provides more efficient cooling, less weight, and higher power generation per transponder than prior art systems would be highly desirable. The present invention combines several techniques in a novel manner to provide a high power and energy efficient satellite based transmitter system. As a result, the output power of such a satellite is increased considerably without a proportional increase in size.

SUMMARY OF THE INVENTION

The present invention relates to power enhancement of a communications satellite through thermal design and thermal interfaces. There are a number of improvements which contribute, and may be applied separately, to provide for a more energy efficient satellite configuration. A first improvement of the present invention is the application of direct radiating elements to each TWT, which permits a higher quantity of heat energy to be removed from the TWTs than by use of the conduction-cooled TWT; and thereby permits the TWTs to produce a higher power signal without overheating. This technique increases the overall transmitting power capabilities of the satellite. The operation of the radiation cooled configuration is superior to (and provides a higher power output) than two conduction cooled TWTs coupled to a single EPC for a given size satellite.

A second improvement of the present invention is the use of an efficient radiator panel encasing a network of heat pipes. This becomes more significant in the configuration where two TWTs are applied to each EPC unit, since the amount of heat generated by the paired TWT units is high compared to the single TWT per EPC configuration, and requires a more effective cooling ability for the amplifiers.

A third improvement is the configuration of the traveling wave tube amplifiers such that two radiation cooled TWTs are powered by a single EPC. This configuration provides higher transmitter power; a reduced overall mass of the satellite; and the ability to combine the power outputs of the two TWTs without an on board phase adjustment which may provide an improved conversion efficiency. The output of the two TWTs may be combined into a single high power output signal. Alternately, the output of each of the two TWTs may be a distinct signal.

BRIEF DESCRIPTION OF THE DRAWING FIGURES

DETAILED DESCRIPTION OF THE PRESENT INVENTION

Figure 1:
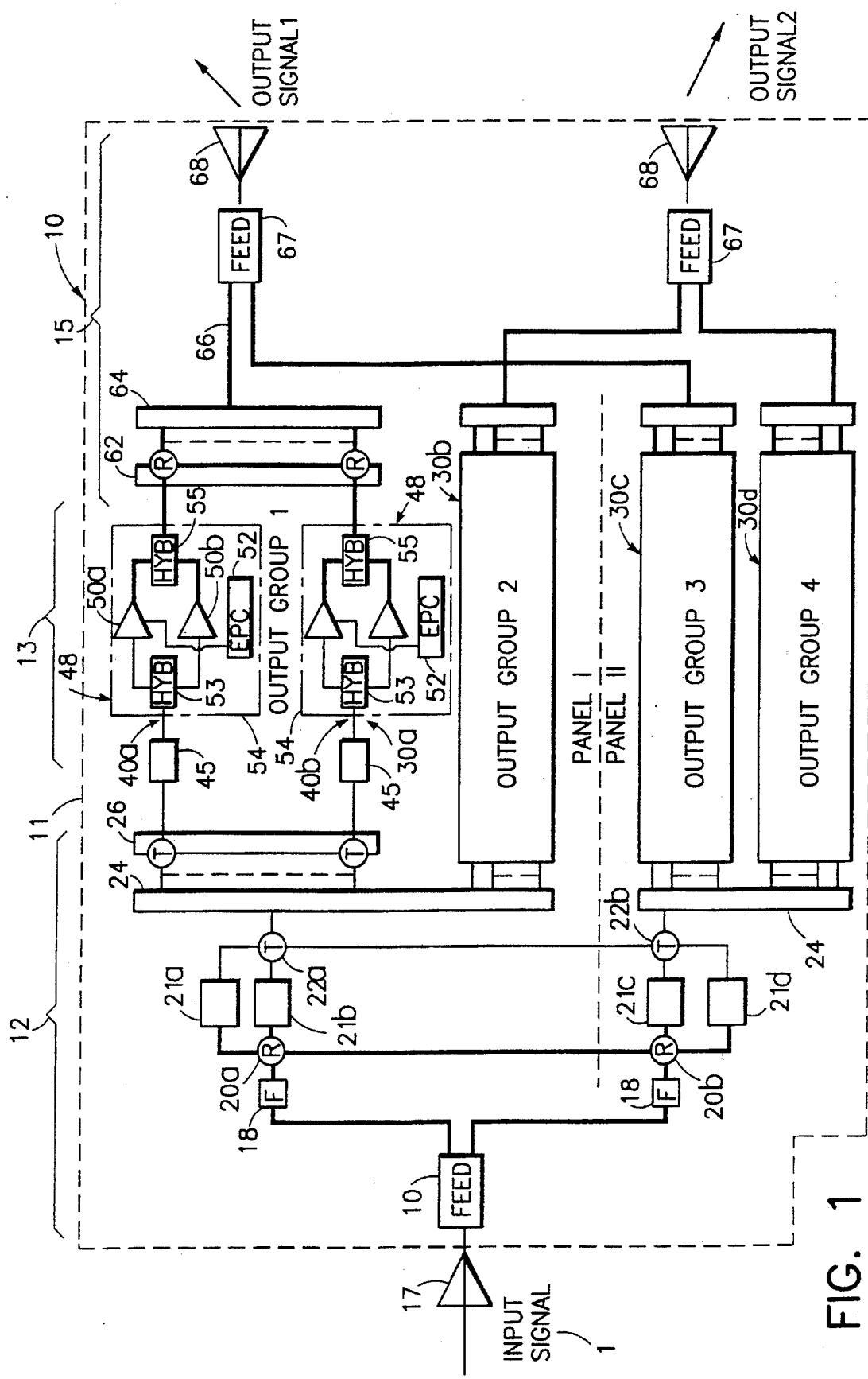
FIG. 1 is a schematic illustration of one embodiment of a signal processing portion of the present invention.

In this present disclosure the term "satellite" is intended to cover standard satellites, spacecraft, etc., and is considered as any device which is capable of traveling in space. The specific values described in the power and cooling descriptions of the present disclosure are intended to be illustrative in nature, and not limiting in scope. Elements which perform similar functions in different embodiments may be provided with identical reference characters.

The present invention combines aspects of several technologies to provide an enhanced signal power output per satellite while also providing adequate cooling. The combination includes the utilization of two TWTs per an electric power conditioner (designated as "EPC" in FIG. 1); the use of radiative cooling for the TWTs; and an efficient radiating panel utilizing a series of heat pipes. These technologies may appear at times to be distinct, but they are actually quite interrelated.

Satellite Electrical System

Reference is now made to FIG. 1. A satellite 10 (not illustrated except in general reference) comprises a signal translation and amplification system 11. The signal translation and amplification system 11 includes a receiver portion 12, a signal amplification portion 13, and a transmitting portion 15.

The receiver portion includes a receiving antenna 17, a feed element 16, a band pass filter (designated as "F" in FIG. 1) 18, at least one R type switch 20a, 20b (R type switches are switches which are inserted in waveguides); a plurality of receivers 21a, 21b, 21c, 21d; at least one T type switch 22a, 22b; an input multiplexer 24; and an input switch ring 26.

The receiving antenna 17 is a commercially available antenna which is used for satellite reception of an input signal 1. The band pass filter 18 blocks out the effect of the signal generated by the transmitting portion 15 which is many times stronger than any signal which is likely to be received from any source external to the satellite. Since one of the primary functions of the satellite is to respond to external signals, the function of the band pass filter 18 becomes even more significant. As can be appreciated, the signal translation and amplification system 11 acts as a repeater which is carried by the satellite 10, to receive an input signal 1, to amplify the input signal 1, and to retransmit the amplified signal.

The elements described in this and the next paragraph control which output group 30a, 30b, 30c, 30d of the signal processing portion 13 a specific signal will be transmitted through. The R type switches 20a, 20b control which of the receivers 21a, 21b, 21c, 21d is activated, and thereby which of the receivers is connected to the receive antenna 17 and the serially connected band pass filter 18. As a matter of illustration, the R type switch 20a can selectively apply a received signal to either of the upper receivers 21a, 21b. This selection is typically made depending upon which of the receivers 21a, 21b is functioning properly. The functioning of the receivers 21a, 21b can be monitored from the ground, since if a receiver is not functioning properly, there will be no output over the corresponding channel from the satellite. The position of the R type switch 20a is controlled from the ground, thereby controlling which receiver 21a, 21b is coupled to the input signal 1 from antenna 17. If it is determined that neither of the upper receivers 21a, 21b is functioning properly, while both of the lower receivers 21c, 21d are functioning properly, then the R type switch 20a will divert its incoming signal to the lower R type switch 20b to apply the signal to one of the lower receivers 21c, 21d. The other lower receiver 21c, 21d will be connected to the antenna 17 via the lower R type switch 20b. This configuration enables the application of a filtered signal from the receiving antenna 17 to any receiver, 21a, 21b, 21c, 21d. The frequency of the received signal establishes which output group 30a, 30b, 30c, 30d processes a specific received signal.

The plurality of receivers 21a, 21b, 21c, 21d are connected to the input multiplexers 24 by a plurality of T type switches 22. The receivers 21a, 21b, 21c, 21d function to receive, amplify, and down-convert the received signal to a desired frequency. The T type switches 22a, 22b, function similarly, but in a reverse sense, to the R type switches 20a, 20b described above to select any two of the four receivers 21a, 21b, 21c, 21d for connection to the input multiplexers 24.

The input multiplexer 24 acts in a manner known in the art to control which one of a plurality (e.g., six) of communication paths 40a, 40b of the signal processing portion 13 the signal may be applied to within each output group (only communication paths 40a and 40b of output group 1 are illustrated for the purposes of display clarity). The input switching ring 26 operates to select, by example, four specific communications paths from six available communication paths (only communication paths 40a and 40b are illustrated) within each output group. For example, if one (or more) of the selected communications paths becomes non-functional, the switching ring 26 is re-configured by ground command to select one of the unused (redundant) communications paths. In FIG. 1, the letter "T" associated with the switching ring 26 represents a function of the switching ring 26 to transmit signals received from the input multiplexer 24 to the selected communication paths. The input multiplexer 24 and the switching rings 26 are both commercially available, and will not be further detailed herein.

The signal amplification portion 13 of FIG. 1 comprises a plurality of output groups designated as, by example and for the purposes of illustration, "output group 1 30a, output group 2 30b, output group 3 30c, and output group 4 30d, respectively". Each output group comprises a plurality of communication paths 40a, 40b (two communication paths are illustrated in the output group 30a of FIG. 1, but there are 6 communication paths in each output group.) Four of the output groups are active (selected) at any given time, and the remaining two are redundant. Each communication path includes a channel amplifier 45 and a TWTA 48. The channel amplifier 45 serves as a preamplifier for the signal to be applied to the TWTA 48.

Each TWTA 48 of FIG. 1 comprises an input hybrid (designated as "HYB" in FIG. 1) 53, an output hybrid 55, and two TWTs 50a, 50b which are powered by one EPC 52. This TWTA configuration provides for improved power conversion efficiency as well as reduced mass. The use of a common EPC 52 also provides the ability to combine the RF output power of the two TWTs 50a, 50b without requiring on-board phase adjustment.

Each TWT is configured to contain a collector radiator 70 (see FIG. 2) which is positioned to be exposed external to the satellite 10, and as such provides a primary path for heat rejection. The collector radiator 70 has a plurality of radiating fins 70. It is envisioned that each of the two TWTs in each of the communication paths could be applied to amplify signals of distinct channels, and thus act separately. Alternately, the two TWTs 50a, 50b could both be applied to the same channel, as shown in FIG. 1. When the TWTs are combined, the signal strength of the TWTs is nearly doubled (it is not actually doubled due to combining losses.) However, the total number of available satellite transmitter channels is also halved. The input hybrid 53 divides the signal strength applied to each TWTA 48 into two substantially even amounts, which are applied to each TWT 50a, 50b.

The transmitter portion 15 includes an output switching ring 62, an output multiplexer 64, a feed element 67 and a transmitting antenna 68. The output ring 62 acts in a known manner, in combination with the input ring 26, to provide the suitable number of properly functioning communication paths from each output group 30a, 30b, 30c, 30d at any given time; and to eliminate non-functional communication paths. The output multiplexer 64 combines the transmissions of all of the signals applied from all of the communication paths within each output group 30a, 30b, etc., such that the signals will be transmitted over a single electrical conduit 66 to the antenna feed 67. In FIG. 1, the letter "R" associated with the output switching ring 62 represents a function of the output switching ring 62 to receive signals from the selected communication paths, whereafter the signals are supplied to the output multiplexer 64.

Whatever signal is transmitted from the output-multiplexer 64 will be transmitted by a respective antenna (each antenna is denoted as "68" in FIG. 1) as an output signal (e.g., such an output signal is denoted in FIG. 1 as "output signal 1" for a first one 68 of the antennas, and as "output signal 2" for a second one 68 of the antennas). Each transmitting antenna 68 receives output signals from one or more output groups 30a, 30b, etc. in the FIG. 1 embodiment. The FIG. 1 embodiment is intended to be illustrative in nature, and not limiting in scope.

Radiation Cooling

Figure 2:
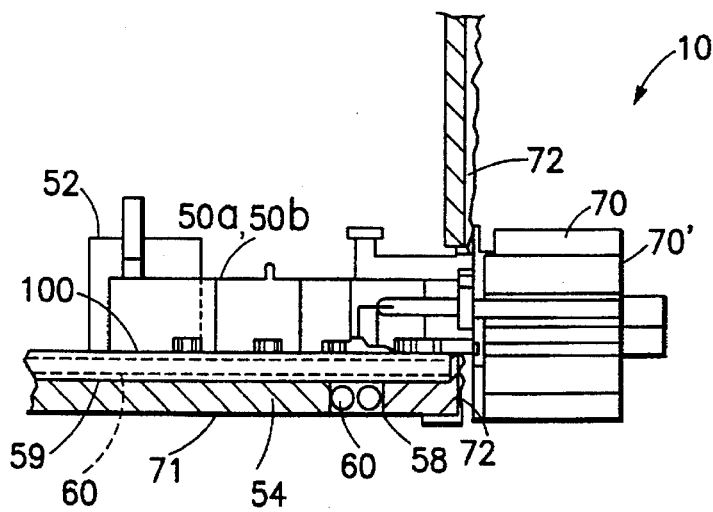
FIG. 2 illustrates a partial cross sectional view of one embodiment of a combined TWT, radiation panel with embedded heat pipes, and collector radiator, of the present invention.

The radiation cooled TWTs 50a, 50b and EPCs 52 are mounted on high efficiency radiation panels 54 as illustrated in FIG. 2, in which the bulk of each radiation panel is formed from an aluminum honeycomb with optical solar reflectors (OSR's) 71 on the radiating side. The OSR's 71 permit heat energy to pass from the radiation panels 54 into space, while reflecting a high percentage of ambient radiation back into space, as is well known in the art. Each radiation panel 54 employs a plurality of parallel embedded heat pipes 58 which are mounted substantially perpendicularly to a plurality of parallel embedded heat pipes 59. This configuration functions to substantially evenly dissipate heat generated by the TWTs and EPCs throughout the radiation panels 54 and into space. A cooling fluid such as ammonia is sealed in channels 60 formed in each embedded heat pipe 58, 59 and provides a heat sink for the heat applied to the radiation panel 54.

It is preferable that the heat pipes 58, 59 be oriented in a crossed arrangement as illustrated. This configuration provides a very efficient heat radiator, permitting the development of a higher power, more energy efficient and lower mass satellite for a given volume than could be achieved otherwise. Heat energy passes by conduction from the TWTs 50a, 50b, via the radiation panel 54, to the heat pipes 58, 59. When the heat energy is in the heat pipes, it is distributed more evenly throughout the heat pipes, and through the radiation panel into space.

Figure 4:
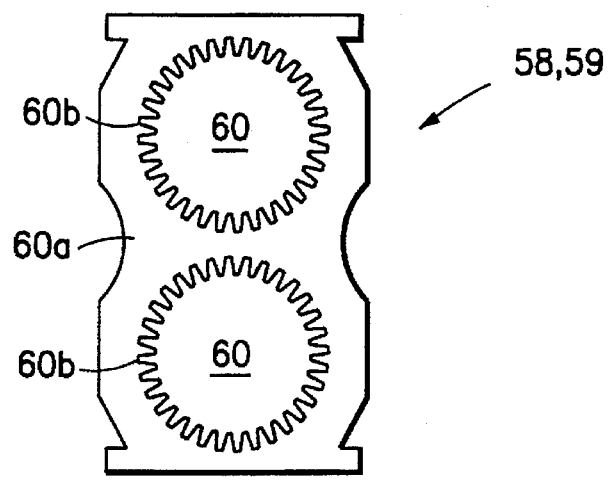
FIG. 4 illustrates an exploded cross sectional view of one of the heat pipes of FIG. 2.

To accommodate components of high concentrated heat loads, heat pipes are used to spread the heat efficiently over the entire OSR 71. Referring to FIG. 4, the fixed-conductance, dual channel heat pipes 58, 59 are preferably formed with axially grooved aluminum tubing with anhydrous ammonia used as the working cooling fluid. In FIG. 4, the tubing is labelled as "60a" and the axial grooves of the tubing are labelled as "60b". Each dual channel heat pipe 58, 59 consists of the two independently operating channels 60. The components are arranged such that failure of a single heat pipe channel in a dual channel heat pipe will not overly limit the cooling capabilities of any of the heat pipes 58, 59; and thereby not impinge upon the overall operation of the satellite 10.

Figure 5:
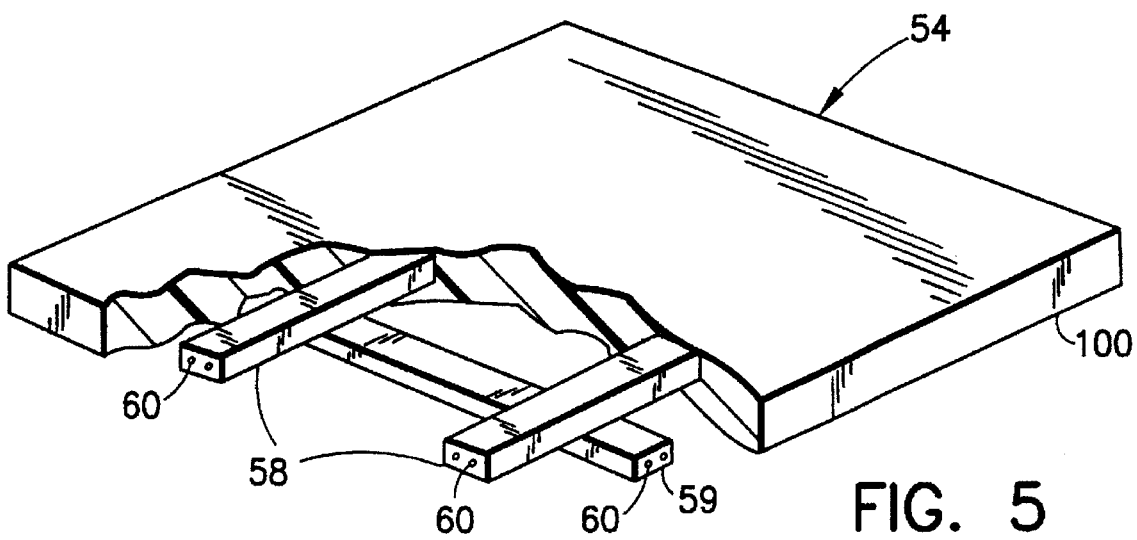
FIG. 5 illustrates a partially broken away view of a segment of one of the radiation panels, with some of the heat pipes exposed.
Figure 6:
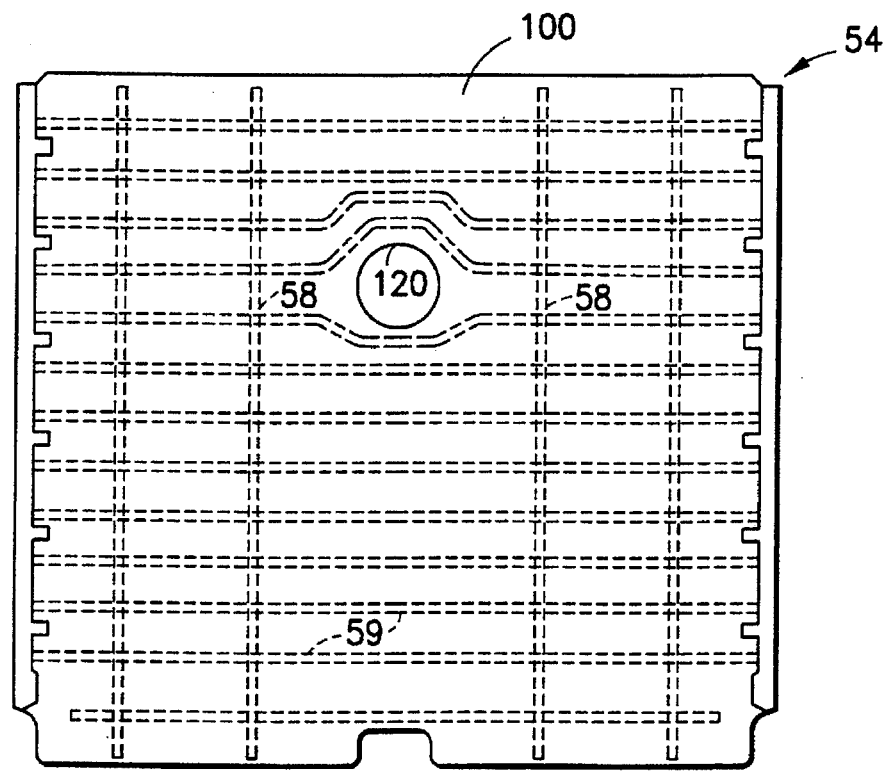
FIG. 6 illustrates a top view of one embodiment of a full radiation panel.

The heat pipe layout for each radiation panel 54 (there are typically two radiation panels per satellite) is configured in a matrix arrangement (see FIGS. 5 and 6) with a total of 13 longer lateral heat pipes 59, and 6 header heat pipes 58 (as illustrated in FIG. 6.) The lateral heat pipes 59 are bonded to an inner communication panel faceskin 100 (see FIG. 2), and come in direct contact with as much of the TWTs 50a, 50b and the EPCs 52 as is possible due to design constraints. The header heat pipes 58 contact each crossing lateral heat pipe 59. Heat energy is transmitted effectively between the header heat pipes 58 and the lateral heat pipes 59. In FIG. 6, a recess 120 is formed in the radiation panel to permit an arm for connecting to the solar array (not illustrated) to extend through.

As can be observed from FIG. 2, heat generated by the TWTs 50a, 50b (and also the unillustrated EPCs 52), can be transferred into space via either a collector radiator 70 or the radiation panel 54. The collector radiator 70 is typically integrally formed with the radiation-cooled TWTs, and provides a passage for heat energy directly into space. A thermal shield 72 is provided to limit the heat energy which has passed from the TWTs 50a, 50b to the collector radiator 70 from passing back to the TWTs. This combination promotes the passage of heat energy into space.

Figure 3A:
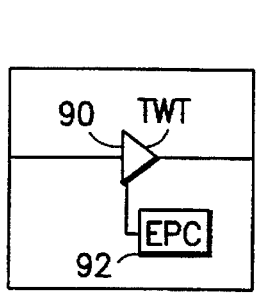
FIG. 3A illustrates one embodiment of a traveling wave tube amplifier of the prior art.
Figure 3B:
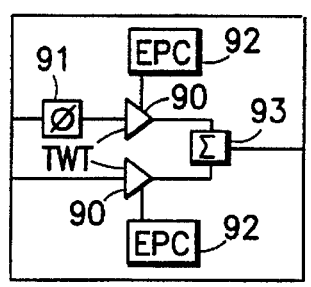
FIG. 3B illustrates an alternate embodiment of a TWTA of the prior art.
Figure 3C:
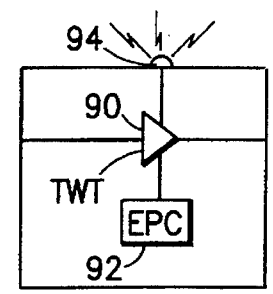
FIG. 3C illustrates a third embodiment of a TWTA of the prior art.
Figure 3D:
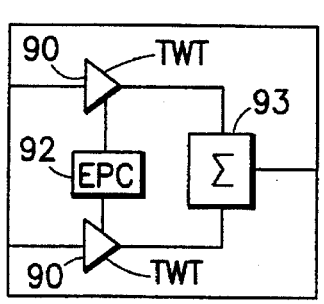
FIG. 3D illustrates a fourth embodiment of a TWTA of the prior art.
Figure 3E:
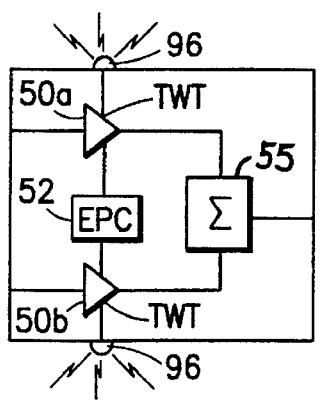
FIG. 3E illustrates a first embodiment of a TWTA of the present invention.
Figure 3F:
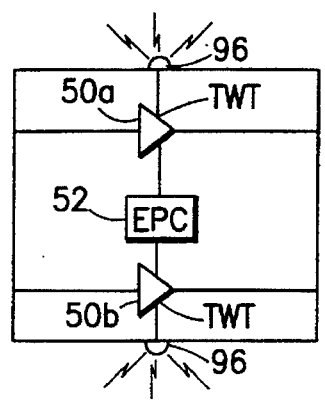
FIG. 3F illustrates a second embodiment of a TWTA of the present invention.

While the prior art conduction-cooled TWTs utilize heat sinks as thermal spreaders to uniformly distribute the thermal energy, the radiation-cooled TWTs of the present invention utilize radiation panels, which contain heat pipes, to distribute at least a significant portion of the remaining TWT heat (the remaining heat is the total TWT heat less that radiated to space by the TWT radiating collector.) The radiation panels utilize the high thermal conductivity of the Table 1 comprising a pair of TWTs 90 powered by a single EPC 92. Outputs of the TWTs 90 are provided to a summer 93. The present invention configuration is illustrated in FIGS. 1, 3E and 3F and corresponds to the "present invention embodiments" of Table 1.

TABLE 1

| PRIOR ART EMBODIMENTS | | | | |
|---|---|---|---|---|
| Satellite body Dimensions (meters) | 2.7 × 2.4 × 2.7 | 2.7 × 3.4 × 3.2 | 2.7 × 3.4 × 3.2 | 2.8 × 3.4 × 3.8 |
| Fig. where illustrated | 3A | 3B | 3C | 3D |
| Number of Transponders | 36 | 36 | 4 | 16/8 |
| Transmitter Power per Transponder | 55 W | 75/150 W | 230 W | 120/240 W |
| Total RF Transmitter Power | 929 W | 1,400 W | 920 W | 1,920 W |
| Satellite DC Power | 3,500 W | 5,000 W | 3,300 W | 5,000 W |
| Transmitter Configuration | 1 EPC 1 TWT | 2 EPC 2 TWT plus phase shift | 1 EPC 1 TWT | 1 EPC 2 TWT |
| TWT Cooling | Conduction | Conduction | Radiation | Conduction |
| Combinable TWT for Power Increase | no | yes | no | yes |
| Heat Pipes | yes | yes | yes | yes |

| PRESENT INVENTION EMBODIMENTS | | |
|---|---|---|
| Satellite Body Dimensions (meters) | 2.7 × 3.4 × 2.7 | 2.7 × 3.4 × 3.2 |
| Figure where illustrated | 1 and 3E or 3F | 1 & 3E or 3F |
| Number of Transponders | 32/16 | 32/16 |
| Transmitter Power per Transponder | 107/208 W | 137/263 W |
| Total RF Transmitter Power | 3,424 W | 4,384 W |
| Satellite DC Power | 8,000 W | 10,000 W |
| Transmitter Configuration | 1 EPC 2 TWT | 1 EPC 2 TWT |
| TWT Cooling | Radiation | Radiation |
| Combination TWT for Power Increase | yes | yes |
| Heat Pipes | yes | yes | heat pipes to uniformly distribute the heat across the panel. Heat distribution with heat sinks and spreaders (thick panel face skins) is much heavier than radiation panels utilizing heat pipes. The collector radiators 70 combine with the radiation panels of the present invention to radiate sufficient heat energy into space so that the TWTs can produce the high energy level associated with the powerful signals while not overheating.

Prior art satellites, limited in size, weight, and launch vehicle fairing envelopes can handle approximately 5000 watts DC, and less than 2000 watts RF radiated power. The present configuration permits 10,000 watts DC, or approximately 4200 watts RF radiated power. Table 1 is a comparison of the present invention and prior art TWTA performance and cooling characteristics. The prior art configurations are illustrated in FIGS. 3A to 3D, and correspond to each of the "prior art embodiments" illustrated in Table 1, as described therein. FIG. 3A illustrates an example of a prior art embodiment referenced in Table 1 comprising one TWT 90 and an EPC 92. FIG. 3B illustrates another exemplary prior art embodiment wherein there are two TWTs 90, each one being powered by a respective individual EPC 92. A phase shifter 91 is coupled to an input of one of the TWTs 92. Outputs of both of the TWTs 90 are coupled to a summer 93. In FIG. 3C, another exemplary prior art embodiment referenced in Table 1 is shown wherein there is a single TWT 90 powered by a single EPC 92. The TWT 90 is provided with heat radiation means 94. FIG. 3D illustrates yet another prior art embodiment referenced in As evident from Table 1, the present invention provides a considerable improvement over the signal power generated compared to the prior art embodiments. The ground receivers (satellite dishes) which are configured to receive signals from the satellite of the present invention can be constructed to be smaller than the prior art satellite dishes due to the stronger signal generated by the satellites, while still receiving a comparable signal strength. This permits the use of less expensive, less obtrusive satellite dishes than those required with the present generation satellites. The use of smaller, less space consuming satellite dishes further enables a greater use of satellite communications in general.

Alternate Present Invention Embodiments

Figure 8:
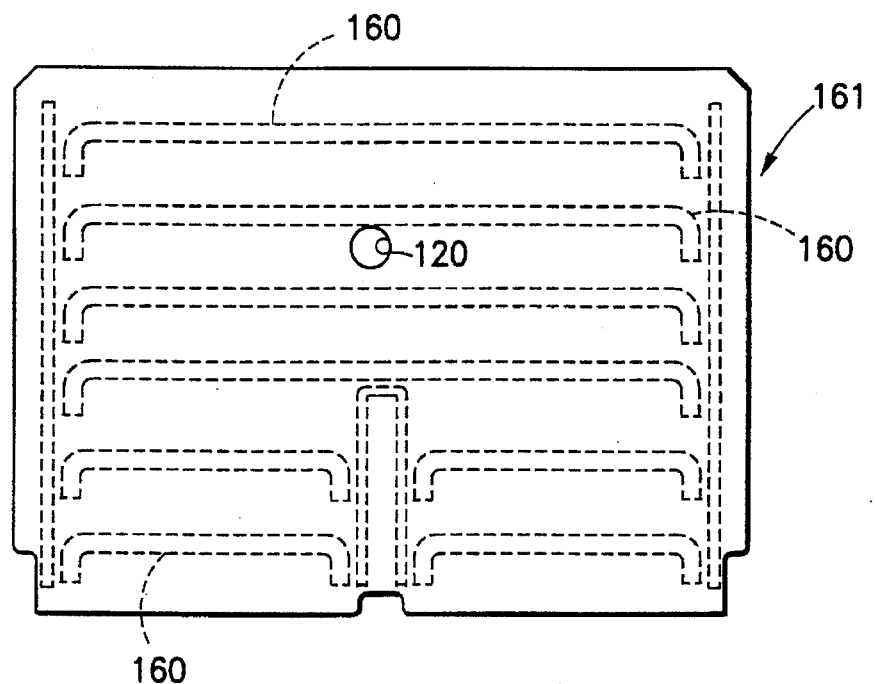
FIG. 8 illustrates a headered heat pipe configuration.
Figure 7A:
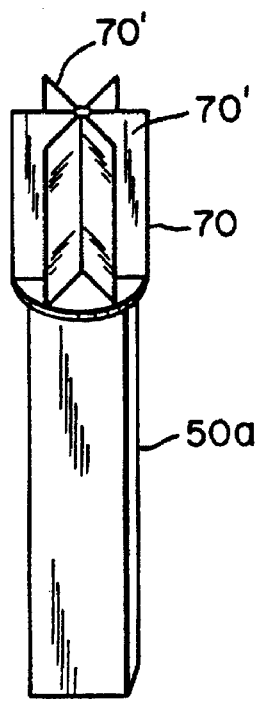
FIG. 7a illustrates a radiative cooling element for a TWT, in which the radiative cooling element is formed with radiative fins.
Figure 7B:
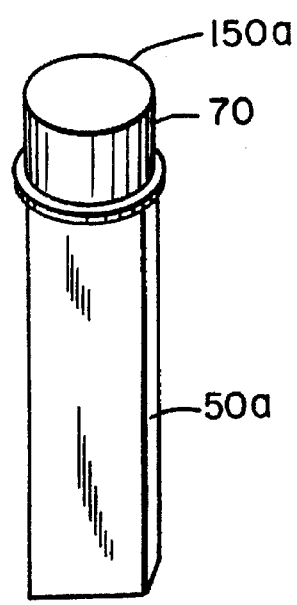
FIG. 7b illustrates a radiative cooling element for a TWT, in which the radiative cooling element is formed with a radiative dome structure.
Figure 7C:
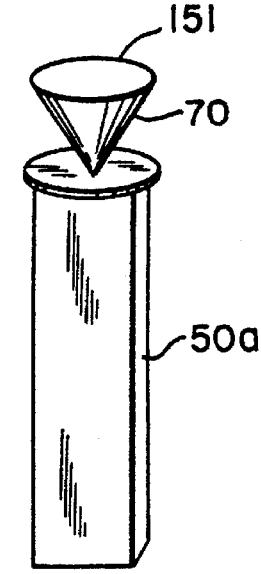
FIG. 7c illustrates a radiative cooling element for a TWT, in which the radiative cooling element is formed with a radiative cone structure.
Figure 7D:
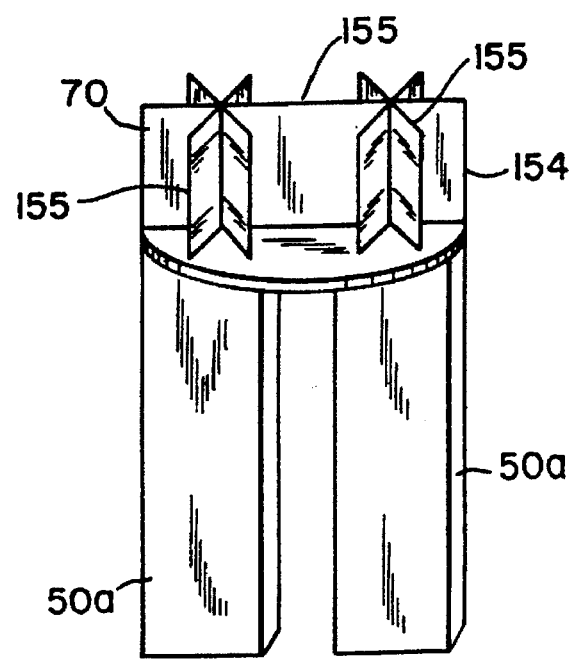
FIG. 7d illustrates a radiative cooling element for a plurality of TWTs, in which the radiative cooling element is formed in two segments, each segment containing a plurality of radiative fins.

FIGS. 1, 2, 3E, 3F, 4, 5, and 6 illustrate different aspects of one embodiment of the present invention. It should be emphasized that there are several modifications which can be made to the above embodiment while remaining within the scope of the present invention. For example, the collector radiator of FIG. 2 has radiating fins to provide radiative cooling from the TWTs. Alternate embodiments of TWT radiation cooling surfaces are illustrated in FIGS. 7a–7d. FIG. 7a illustrates a TWT 50a similar to the one shown in the FIG. 2, wherein the TWT 50a has a collector radiator 70 including a plurality of radiating fins 70'. FIG. 7b illustrates a TWT 50a having a collector radiator 70 which includes a dome radiating cooling element 150a. FIG. 7c illustrates a TWT 50a having a collector radiator 70 with a cone radiating cooling element 151. FIG. 7d illustrates a plurality of TWTs 50a including a collector radiator 70. The TWTs 50a of FIG. 7d are both cooled by a distinct radiation portion 154, including fins 155, forming the collector radiator 70; each radiation portion has a plurality of radiating fins which are intertwined. Any other suitable radiating device which may be affixed to a TWT to radiate heat into space is within the scope of the present invention. FIGS. 5 and 6 illustrate an exemplary embodiment of the invention wherein heat pipes 58, 59 associated with radiation panel 54 are cross-hatched. The heat pipes 58, 59 have operating channels 60 (FIG. 5). The benefits of cross-hatching the heat pipes has previously been described. However, it is also within the scope of the present invention to provide heat pipes 160 in a headered configuration as illustrated in FIG. 8. The headered configuration has also been found to distribute heat energy effectively across a relatively large radiation panel 161 (thereby assisting in radiative cooling.) Any suitable heat pipe configuration which provides efficient heat distribution across a radiation panel is within the scope of the present invention.

While several embodiments are disclosed in this specification, this specification is not intended to be limiting in scope, other configurations which are within the scope of the claims are intended to be included within the scope of the present invention.

What is claimed is:

1. A signal translation and amplification system comprising:

at least one RF energy communication path comprising a plurality of radiation-cooled traveling wave tubes (TWTs) powered by a single electronic power conditioner (EPC), each TWT of the plurality of TWTs comprising a respective radiator component that is thermally coupled to the corresponding TWT for providing a primary path of radiating heat into space; and a high efficiency radiation panel that is thermally coupled along a first major surface thereof to each of said plurality of TWTs and to said EPC for providing a separate path of transferring thermal energy therefrom, said radiation panel comprising thermal transfer means for transferring the thermal energy from said first major surface to a second, opposite major surface whereat the thermal energy is radiated into space, wherein said thermal transfer means is comprised of a plurality of embedded heat pipes, and wherein each embedded heat pipe contains a plurality of fluid-containing channels.

2. The signal translation and amplification system as described in claim 1, wherein said radiation panel defines a portion of a spacecraft.

3. The signal translation and amplification system as described in claim 2, and further comprising:

at least one receive antenna for receiving RF energy transmissions from a terrestrial station transmitter, said at least one receive antenna having an output coupled to an input of each of said plurality of TWTs; and at least one transmit antenna for transmitting amplified RF energy transmissions to a terrestrial station receiver, said at least one transmit antenna having an input coupled to an output of each of said plurality of TWTs.

4. The signal translation and amplification system as described in claim 1, wherein said radiation panel is further comprised of a solar radiation reflector that is disposed over said second major surface, said solar radiation reflector for reflecting solar radiation energy impinging on said second major surface back into space.

5. The signal translation and amplification system as described in claim 1, wherein said plurality of embedded heat pipes define a cross-hatched network for approximately uniformly distributing the thermal energy over an area of the radiation panel.

6. An RF signal translation and amplification system, comprising:

at least one receive antenna for receiving RF energy transmissions, said at least one receive antenna having an output coupled to an input of individual ones of a pair of traveling wave tubes (TWTs), each of said individual ones of said pair of TWTs comprising a respective radiator component that is thermally coupled to a collector of the corresponding TWT for providing a primary path of radiating heat into space;

at least one transmit antenna for transmitting amplified RF energy transmissions, said at least one transmit antenna having an input respectively coupled to a corresponding output of individual ones of said pair of TWTs;

one electronic power conditioner (EPC) module having outputs respectively coupled to individual ones of said pair of TWTs; and a support assembly to which at least said individual ones of said pair of TWTs and said EPC are mounted, said support assembly comprising a radiator panel that is thermally coupled along a first major surface thereof to said individual ones of said pair of TWTs and to said EPC for providing a separate path of transferring thermal energy therefrom, said radiator panel comprising thermal transfer means for transferring the thermal energy from said first major surface to a second, opposite major surface whereat the thermal energy is radiated into space; wherein said thermal transfer means is comprised of a first plurality of embedded heat pipes disposed within a first plane and in a parallel relationship with respect to one another, and a second plurality of embedded heat pipes disposed within a second plane that is parallel to the first plane and in a parallel relationship with respect to one another and in an orthogonal relationship to said first plurality of embedded heat pipes, wherein each embedded heat pipe contains a respective plurality of coolant fluid-containing channels.

7. An RF signal translation and amplification system as set forth in claim 6, wherein said radiator panel comprises a cellular structural material in which said first and second plurality of heat pipes are embedded.

8. An RF signal translation and amplification system as set forth in claim 6, wherein said radiator panel is further comprised of a solar radiation reflector that is disposed over said second major surface.

9. An RF signal translation and amplification system as set forth in claim 6, wherein individual ones of said first and second plurality of embedded heat pipes are thermally coupled together at locations where said first and second plurality of embedded heat pipes intersect.

10. An RF signal translation and amplification system as set forth in claim 6, wherein each embedded heat pipe contains a plurality of coolant fluid-containing channels respectively having axially grooved channel surfaces.

11. A signal translation and amplification system comprising:

at least one RF energy communication path comprising a plurality of radiation-cooled traveling wave tubes (TWTs) powered by a single electronic power conditioner (EPC), each TWT of the plurality of TWTs comprising a respective radiator component that is thermally coupled to the corresponding TWT for providing a primary path of radiating heat into space; and a high efficiency radiation panel that is thermally coupled along a first major surface thereof to each of said plurality of TWTs and to said EPC for providing a separate path of transferring thermal energy therefrom, said radiation panel comprising thermal transfer means for transferring the thermal energy from said first major surface to a second, opposite major surface whereat the thermal energy is radiated into space, wherein said thermal transfer means is comprised of a first plurality of embedded heat pipes disposed parallel to one another, and a second plurality of embedded heat pipes disposed parallel to one another and orthogonal to said first plurality of embedded heat pipes, and wherein each embedded heat pipe contains a respective plurality of fluid-containing channels having axially grooved channel surfaces.

12. The signal translation and amplification system as described in claim 11, wherein said first plurality heat pipes are disposed in a first plane, said second plurality of heat pipes are disposed in a second plane that is parallel to the first plane, and wherein individual ones of said first and second plurality of heat pipes are thermally coupled together at locations where said first and second plurality of heat pipes intersect.

13. The signal translation and amplification system as described in claim 11, wherein said respective fluid containing channels contain a corresponding coolant comprised of ammonia.

14. The signal translation and amplification system as described in claim 11, wherein each channel is sealed.

* * * * *